United States Patent
Lee

(10) Patent No.: US 9,424,545 B1
(45) Date of Patent: Aug. 23, 2016

(54) GEOSPATIAL CONSTRUCTION TASK MANAGEMENT SYSTEM AND METHOD

(71) Applicant: Hito Management Company, Chatham, IL (US)

(72) Inventor: James Lee, Chatham, IL (US)

(73) Assignee: Hito Management Company, Chatham, IL (US)

( * ) Notice: Subject to any disclaimer, the term of this patent is extended or adjusted under 35 U.S.C. 154(b) by 0 days.

(21) Appl. No.: 14/597,744

(22) Filed: Jan. 15, 2015

(51) Int. Cl.
| G06F 7/00 | (2006.01) |
| G06Q 10/06 | (2012.01) |
| G06F 3/0484 | (2013.01) |
| G06F 3/0482 | (2013.01) |

(52) U.S. Cl.
CPC ..... *G06Q 10/063114* (2013.01); *G06F 3/0482* (2013.01); *G06F 3/04842* (2013.01); *G06F 3/04847* (2013.01)

(58) Field of Classification Search
CPC .... G06Q 10/10; G06Q 10/103; G06Q 10/06; G06Q 10/087; G06Q 50/08; G06Q 10/063; G06Q 10/0631
USPC .................. 235/375, 376, 435, 462.01, 492; 705/7.11, 7.21
See application file for complete search history.

(56) References Cited

U.S. PATENT DOCUMENTS

| 8,275,653 | B2 | 9/2012 | Cassels et al. | |
| 8,788,496 | B2 | 7/2014 | Darby, Jr. et al. | |
| 2006/0271480 | A1* | 11/2006 | Allin et al. | 705/40 |
| 2008/0281510 | A1* | 11/2008 | Shahine | G06Q 10/06 701/408 |
| 2009/0024442 | A1* | 1/2009 | Brink et al. | 705/9 |
| 2010/0312599 | A1* | 12/2010 | Durst | 705/8 |
| 2011/0087662 | A1 | 4/2011 | Darby, Jr. et al. | |
| 2013/0113739 | A1* | 5/2013 | Lee | G06Q 10/10 345/173 |
| 2013/0288719 | A1* | 10/2013 | Alonzo | 455/457 |
| 2014/0066099 | A1* | 3/2014 | Eng et al. | 455/456.3 |
| 2014/0095119 | A1* | 4/2014 | Lee et al. | 703/1 |
| 2014/0192056 | A1* | 7/2014 | Bailiang et al. | 345/440 |

FOREIGN PATENT DOCUMENTS

WO    2011041618 A2    4/2011

* cited by examiner

*Primary Examiner* — Laura Gudorf

(74) *Attorney, Agent, or Firm* — Banner & Witcoff, Ltd.

(57) ABSTRACT

Methods, systems, computer-readable media, and apparatuses for providing geospatial worksite management for large-scale construction projects are presented. In some embodiments, a computing device may receive a geographic map of a construction site and a construction schedule including multiple tasks. The computing device may display the geographic map and receive a selection of a geographic location on the geographic map. The computing device may determine that a first set of tasks is associated with the geographic location and may display an object associated with the first set of tasks overlaid on the geographic map at the determined geographic location. The object may represent a structure to be constructed at the construction site.

17 Claims, 11 Drawing Sheets

GEOSPATIAL CONSTRUCTION TASK MANAGEMENT SYSTEM AND METHOD

FIELD

Aspects of the disclosure relate to computer hardware and software. In particular, one or more aspects of the disclosure generally relate to computer hardware and software for providing geospatial worksite management for large-scale construction projects.

BACKGROUND

Large-scale construction projects can include thousands of tasks that must be completed in a highly coordinated manner in order for the project to be completed on time. Currently, lengthy complicated schedules are used to coordinate timing and completion of these tasks. Many tools employ the use of Gantt charts to track the progress of the project, which is a data table along with a time scaled bar chart. However, when printed, the Gantt chart can be anywhere from 50 to 150 pages in length. As a result, a Gantt chart of this length is not useful to managers and field workers of the project since most of the information is not relevant to a particular worker. Additionally, by the time the Gantt chart is analyzed and understood the information is outdated leading to delays in completion of tasks and/or the project. Exacerbating the problem is that fact updates in the progress of the tasks are made by managers and workers once they return from the field rather than when they are in the field resulting in an outdated Gantt chart even before any analysis of the Gantt chart is begun.

Further, construction workers in the field actually completing the tasks of the project have no way to access information regarding tasks. Often times, a construction worker may need to know what tasks are in progress around him or her and/or what tasks are in progress at various locations of the construction site. Currently, there is no way for the construction worker to quickly and efficiently look up what activities are being performed at various locations of the construction site while in the field. Additionally, even when a construction worker is at a location where multiple tasks are in progress, the construction worker has no way to quickly identify what tasks are in progress for the next few weeks.

Accordingly, there is a persistent need to reduce the time in analyzing the progress of large-scale construction projects as well as to inform construction workers of what tasks are in progress around them in a usable format.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Various aspects of the disclosure provide more efficient, effective, functional, and convenient ways of providing geospatial worksite management for large-scale construction projects. In particular, in one or more embodiments discussed in greater detail below, geospatial worksite management functionalities are implemented, and/or used in a number of different ways to provide one or more of these and/or other advantages.

A mobile device such as a smartphone or tablet may display a geographic map of a construction site with geographic areas that have scheduled activities depicted with shapes or markers overlaid on the geographic map. The geographic map may be in the form of satellite imagery of the construction site. The displayed geographic map may include time-phasing capabilities. For example, the displayed geographic map may only include those shapes or markers for activities scheduled to occur during a specified time period. As the specified time period changes, so too do the shapes or markers displayed on the geographic map. As a result, the displayed geographic map may reveal the spatial and temporal relation of scheduled activities allowing a construction worker or construction manager to understand what activities are to be completed at different areas of the construction site and during what time periods.

In some embodiments, a computing device may receive a geographic map of a construction site and a construction schedule including multiple tasks. The computing device may display the geographic map and receive a selection of a geographic location on the geographic map. The computing device may determine that a first set of tasks are associated with the geographic location and may display an object associated with the first set of tasks overlaid on the geographic map at the geographic location.

In some embodiments, a computing device may receive a geographic map of a construction site and a construction schedule including multiple tasks. The computing device may display the geographic map and a date slider. The computing device may receive a selection of a time period using the date slider and may determine which tasks are scheduled to be in progress during the time period using the construction schedule. The computing device may display one or more objects associated with one or more tasks overlaid on the geographic map respectively at one or more geographic locations associated with the one or more tasks.

In some embodiments, a computing device may receive a geographic map of a construction site and a construction schedule including multiple tasks. The computing device may scan a quick response (QR) code, determine one or more constraints using the QR code, and determine one or more tasks that meet each of the constraints. The computing device may determine one or more geographic locations of the one or more tasks and may display one or more objects associated with the one or more tasks overlaid on the geographic map respectively at the one or more geographic locations.

These features, along with many others, are discussed in greater detail below.

BRIEF DESCRIPTION OF THE DRAWINGS

The present disclosure is illustrated by way of example and not limited in the accompanying drawings in which like reference numerals indicate similar elements and in which.

DETAILED DESCRIPTION

Figure 1:
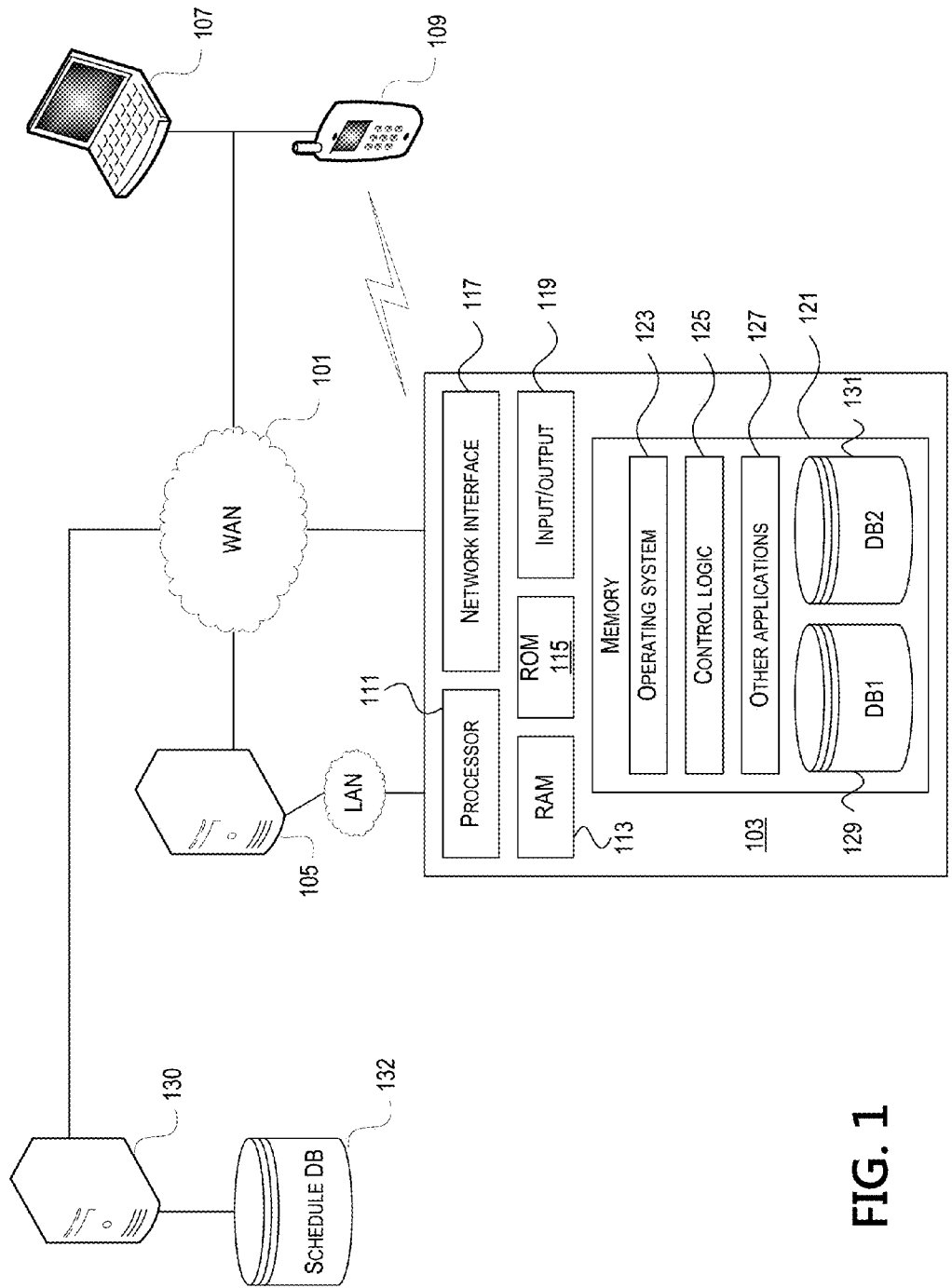
FIG. 1 depicts an illustrative network architecture and data processing device that may be used to implement one or more illustrative aspects described herein.

In the following description of the various embodiments, reference is made to the accompanying drawings, which form a part hereof, and in which is shown by way of illustration various embodiments in which the geospatial worksite management solution may be practiced. It is to be understood that other embodiments may be utilized and structural and functional modifications may be made without departing from the scope of aspects discussed herein. The geospatial worksite management system is capable of other embodiments and of being practiced or being carried out in various ways.

Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

One or more aspects described herein provide individuals and other entities with an analysis of thousands of tasks of a large-scale construction project and provides applications configured for accessing and manipulating the analysis in a usable format. The application may be specific to a large-scale construction project or may be used with multiple large-scale construction projects. The application may include applications that execute on a mobile device (e.g., an app on mobile communication device) and respond to touch input via a touchscreen of the mobile device. The application may include applications configured to execute on another mobile device (e.g., a laptop) or stationary device (e.g., a desktop computer) and the like. The application may be configured to receive information from one or more distributed databases storing project data of a large-scale construction project. In some examples, the application may retrieve project data in response to user input. In other examples, a server communicatively coupled with one or more of the databases may periodically retrieve and push project data to the application.

Analysis of the project data for a large-scale construction project may be performed remotely by the server associated with one or more databases or, in some instances, may be performed locally by the device (e.g., smartphone, laptop, etc.) executing the application. As discussed herein, the application may be specific to project management data for a large-scale construction projects. However, in some embodiments, the application may be general to any project management data that has numerous tasks and is not limited to construction projects. For example, the application may provide access to project management data for creating a website, a software application, a hardware device, a presentation, or any object that has numerous tasks to complete in a highly coordinated manner.

A mobile device may use the application or a browser to display a geographic map of a construction site with geographic areas that have scheduled tasks depicted with objects (e.g., shapes or markers) overlaid on the geographic map. For example, a construction schedule for constructing a building or other structure at a construction site may include numerous tasks and specify specific times when a particular task is to be started and completed (e.g., a start date and a completion date). The time period between the start date and the completion date may be referred to as a time period during which the task is scheduled to be in progress. Additionally, each task of the construction schedule may be linked with the area of the construction site at which the task is to be completed. For example, one of the tasks may be to pour concrete for the garage. The pour concrete task may be linked with the geographic area of the construction site where the garage is to be built.

The displayed geographic map may include time-phasing capabilities. For example, the displayed geographic map may only include those objects (e.g., shapes or markers) for tasks scheduled to occur during a specified time period. As the specified time period changes, so too do the objects displayed on the geographic map. For example, during a first specified time period (e.g., from July 7 to July 14), the displayed geographic map may include objects for tasks scheduled to be in progress during one of those days. During a second specified time period (e.g., from July 15 to July 21), the displayed geographic map may include objects for tasks scheduled to be in progress during one of those days. During the second specified time period, the displayed geographic map might not include objects for tasks that are not scheduled to be in progress during the second specified time period. Further, as discussed above, each of the displayed objects are overlaid on the geographic map at the geographic location at which its associated task is to be completed. For example, the object for the pour concrete task may be overlaid on the geographical map at the location where the garage is to be built. As a result, the displayed geographic map may reveal both the spatial and temporal relation of scheduled tasks allowing a construction worker or construction manager to easily understand what tasks are to be completed during a specified time frame and where those are located within the construction site.

The objects for the tasks may represent a physical structure (e.g., a building) being constructed at the construction site. In some instances, the objects may be shaped so as to resemble the physical structure they represent. For example, the object may be shaped as 3-dimensional building. Thus, the time-phasing of the map may result in a 4-dimensional animation effect on the displayed geographic map. In other instances, the objects may be shaped to resemble a cross-sectional shape of the physical structure. In yet other instances, the objects may be a two-dimensional representation such as a polygon, line, or other marker (e.g., thumb pin).

In some embodiments, objects may be associated with a different color to help a viewer distinguish each of the overlay objects when multiple objects are included in the displayed geographic map. Alternatively, in some embodiments, the color of the object may be used to reflect different attributes of the scheduled tasks. For example, different colors may represent different trades, different weather sensitivities of the tasks (e.g., an exterior painting task might not be completed in the rain), different execution phases (e.g., tasks not yet started, tasks in progress, tasks completed, etc.), different companies responsible for completing the tasks, and/or different utilized resources.

As discussed above, the geographic map may be in the form of satellite imagery of the construction site. However, if satellite imagery is not available, drawings (e.g., computer-aided design drawings) or other blueprints may be used as the map. In some embodiments, the geographic map may be a floor plan of a large manufacturing plant or building. In such embodiments, the construction schedule may be for a movable structure such as tasks to build an airplane, satellite, etc.

The application may provide field construction workers the ability to access specific tasks of a large-scale construction project using multiple preset queries while also affording the worker the ability to update the tasks in the field in real-time. Each preset query may retrieve and present a dynamic dataset to a user of the application. The dataset may be associated with one or more tasks of the project. Each preset query may be linked and/or otherwise assigned to a particular quick response (QR) code that a worker may scan to trigger the query and obtain a subset of tasks. Additionally or alternatively, the query may include a dynamic input values (e.g., a geographic coordinate of the smartphone to provide the worker with tasks being completed near the worker). Objects associated with the tasks may be presented to the worker overlaid on a geographic map at a geographic location where the task is to be completed. The object may be selected by the worker to obtain detailed information about the tasks associated with the object. Thus, the application may present each worker in a large-scale construction project with information on one or more tasks, of the thousands of tasks, relevant to that specific person. Additionally, the application may inform the worker of what tasks are in progress at various geographic locations during a particular time period. As a result, a worker does not have to search through thousands of tasks of a project to find the few tasks relevant to him or her and does not have to determine what tasks are in progress at different geographic locations of the project.

Additionally, the application enables a worker to update the progress of a task while in the field. For example, the worker may update fields of the tasks including e.g., an estimated completion date, a percentage complete field, and other information found on a project schedule of large-scale construction projects. For example, the worker may use the smartphone to take a picture of the activity and may link the picture with the task for others to view. Once a worker updates a task in the field, the application may transmit the updated information to one or more of the distributed databases storing the construction schedule so that others may access the updated information. The updated information may be integrated into a master database (e.g., database 129 or database 132 discussed herein) to update the schedule with only the updated and additional data.

Other features and advantages of the disclosure will be apparent from the additional description provided herein.

FIG. 1 illustrates one example of a network architecture and data processing device that may be used to implement one or more illustrative aspects described herein. Various network nodes 103, 105, 107, 109, 130 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media. For example, as shown, device 109 may be connected to various network nodes 103, 105, 107, and 130 via a radio frequency, such as, for example, a cellular communications signal.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, client computer 107, and a mobile device 109. Data server 103 provides overall access, control and administration of databases and control software for performing one or more illustrative aspects described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computer 107, e.g., using a web browser to connect to the data server 103 via one or more externally exposed web sites hosted by web server 105. Client computer 107 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet). Similarly, mobile device 109 may be used in concert with data server 103 to access data stored therein, or may be used for other purposes. For example, from mobile device 109 a user may access web server 105 using an Internet browser or by executing a mobile application that communicates with the web server 105 and/or data server 103 over a network (e.g., Internet, cellular network, etc.).

The mobile device 109 (e.g., a smartphone, a tablet, a laptop, etc.) may include a variety of components. For example, mobile device 109 may include a visual display component (e.g., a touchscreen or other display screen) to present information to the user. Mobile device 109 may include a user input component (e.g., a touchscreen, physical buttons, keyboard, mouse, a stylus, or the like) to receive input from a user. Mobile device 109 may include a position determining component (e.g., a global positioning system) to determine the geographic location of mobile device 109. Mobile device 109 may include an optical detection component (e.g., a camera, scanner, etc.) to take a photographs, pictures, or images of physical objects. Mobile device 109 may include a wireless communication component (e.g., a cellular transceiver, a WIFI transceiver, etc.) to communicate with remote devices (e.g., web server 105).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects as described herein, and other application software 127 providing secondary, support, and/or other functionality which may or may not be used in conjunction with aspects discussed herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

Network node 130 may be a server or other processing device for providing scheduling data for a large-scale construction project using a scheduling algorithm. The scheduling server 130 may be connected to and/or may include a scheduling database 132. The scheduling server 130 may include similar components to that of data server 103 and may communicate with various other nodes (e.g., data server 103). Scheduling server 130 may also store, retrieve, and manipulate scheduling data for a large-scale construction project stored in scheduling database 132. In some embodiments, scheduling server 130 and scheduling database 132 may be associated with an entity different an entity associated with data server 103 or devices 107, 109.

One or more aspects of the geospatial worksite management system may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein.

The geospatial worksite management system may be implemented using the network architecture described in FIG. 1. For example, the geospatial worksite management system may be implemented via one or more of the data server 103, the web server 105, the client computer 107, and/or mobile device 109.

Figure 2:
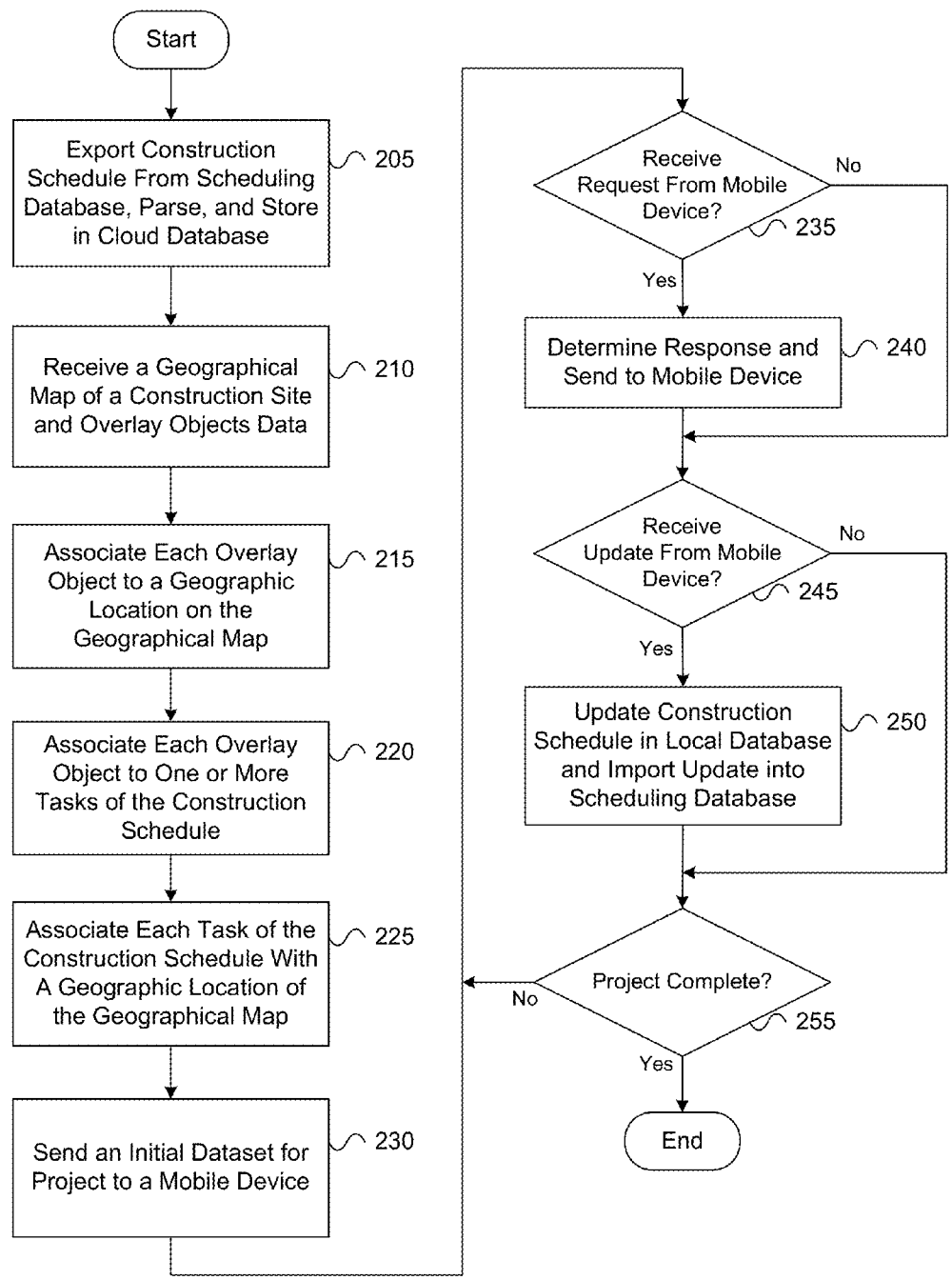
FIG. 2 depicts an illustrative flowchart for linking datasets in accordance with one or more illustrative aspects discussed herein.

FIG. 2 depicts an illustrative flowchart for linking datasets in accordance with one or more illustrative aspects discussed herein. In one or more embodiments, the method of FIG. 2 and/or one or more steps thereof may be performed by a computing device (e.g., data server 103). In other embodiments, the method illustrated in FIG. 2 and/or one or more steps thereof may be embodied in computer-executable instructions that are stored in a computer-readable medium, such as a non-transitory computer-readable memory. In some instances, one or more of the steps of FIG. 2 may be performed in a different order. In some instances, one or more of the steps of FIG. 2 may be omitted and/or otherwise not performed.

As seen in FIG. 2, the method may begin at step 205 in which a computing device (e.g., data server 103) may export a construction schedule for a large-scale construction project from a scheduling database (e.g., scheduling database 132), parse the construction schedule, and store the construction schedule in a database in a cloud (also referred to herein as a cloud database). The construction schedule may include a timeline (e.g., start date, end date, in progress dates, etc.) for completing each of the tasks of the construction project. Additionally, the construction schedule may identify a particular sequence (e.g., order) in which each of the tasks is to be completed. The construction schedule may identify critical paths and longest paths. A critical path may be a path through the project with zero total float (i.e., the maximum amount of time an activity can be delayed from its start date without delaying the entire project). A longest path may be a path through the project having the longest duration. The construction schedule may include numerous fields and attributes found in construction schedules. For example, the construction schedule may include, for each task of the construction schedule, values for lag days, float days, start date, end date, in progress dates, predecessor task, successor task, resources (e.g., labor, supplies, etc.), discipline, group, task identifier, task type, task name, structure identifier, or the other fields.

In some embodiments, the construction schedule may be a Primavera P6 schedule. In such an example, the construction schedule may be in the form of XER file that is specific to the Oracle Primavera Project. In other embodiments, the construction schedule may be in other proprietary forms or other file types. Once the construction schedule is exported, data server 103 may parse the construction schedule and store the construction schedule in a local database (e.g., database 129) and/or may store the schedule in a cloud database for access by other devices (e.g., laptop 107, mobile device 109, or the like).

In step 210, data server 103 may receive a geographical map of a construction site and objects for overlay on the geographical map (also referred to herein as overlay objects). For example, in step 210, data server 103 may receive the geographical map from a computing device that generated the geographical map or, alternatively, an operator of data server 103 may upload the geographical map, which may be in the form of a keyhole markup language (KML) file, a compressed KML file (KMZ), or other file type. The geographical map of the construction site may include and/or otherwise be associated with numerous geographical locations. For example, each location of the geographical map may correspond to a particular latitude and longitude and/or a particular location identifier.

Data server 103 may also receive overlay objects data from another computing device or the operator of data server 103 may upload the overlay objects. The overlay objects may be in the form of a tagged image file (TIFF) file or other file type. In some instances, the overlay objects may be part of the KML file. The overlay objects data may include one or more graphical objects. Each overlay object may represent a physical structure being constructed at the construction site. In some instances, each overlay objects may be shaped so as to resemble the physical structure it represents. In other instances, each overlay object may be shaped to resemble a cross-sectional shape of the physical structure to be constructed at the geographic location of the construction site. In yet other instances, each overlay object may be any shape, line, or other marker (e.g., thumb pin).

In some embodiments, each overlay object may be associated with a different color to help a viewer distinguish each of the overlay objects when multiple overlay objects are displayed at mobile device 109 discussed in further detail below. Alternatively, in some embodiments, the color of the object may be used to reflect different attributes of the represented scheduled tasks. For example, different colors may represent different trades, different weather sensitivities of the tasks (e.g., an exterior painting task might not be completed in the rain), different execution phases (e.g., tasks not yet started, tasks in progress, tasks completed, etc.), different companies responsible for completing the tasks, and/or different utilized resources.

In step 215, data server 103 may associate each overlay object to a geographical location of the geographical map. For example, in step 215, data server 103 may automatically link and/or otherwise tag each overlay object when the overlay object data includes geographical information/coordinates (e.g., latitude and longitude, location identifiers specific to the geographical map, or the like). Alternatively, the operator of data server 103 may select an overlay object and may also select a geographic location of the geographical map. Data server 103 may then link the selected geographical location with the selected overlay object by e.g., tagging the geographical location and/or the overlay object. The operator may perform this linking process for each overlay object that is not automatically linked by the data server 103. Each association or link may be in the form of a tag, table, index, or the like.

In the above discussion, data server 103 automatically and/or through the use of an operator associated each of the overlay objects with geographic locations of the geographical map. In an alternative embodiment, the received overlay objects may already include association information for each overlay object to geographic locations of the geographical map of the construction site. In such an embodiment, the association and/or linking may be performed by another computing device (and/or entity). For example, the association of the overlay objects to the geographical map may be performed by the computing device and/or entity that generated the geographical map or overlay objects.

In step 220, data server 103 may associate each overlay object to one or more tasks set forth in the construction schedule. For example, in step 220, data server 103 may automatically link and/or otherwise tag each overlay object to one or more tasks when the received overlay object data also includes structure identifiers. For example, data server 103 may match the structure identifiers of the overlay objects with structure identifiers of the tasks. Alternatively, the operator of data server 103 may select an overlay object and may also select one or more tasks from the schedule. The operator may then link the overlay object with the selected one or more tasks by e.g., tagging the overlay object and/or the one or more tasks. In one example, the operator may create and/or otherwise add activity codes in scheduling database 132 to match overlay objects or other shapes in the KML file prior to exporting XER file. Then, the operator may later select activity codes that match the names of the shapes or overlay objects. The operator may perform this linking process for each overlay object or shape that is not automatically linked by data server 103. The link may be in the form of a tag, table, index, or the like.

In step 225, data server 103 may associate each task of the schedule with a geographic location of the geographical map. For example, in step 225, data server 103 may automatically link a task of the construction schedule to a geographic location. Alternatively, the operator of data server 103 may select a geographic location of the geographical map and may also select a task or activity of the schedule. Data server 103 may then link the selected geographical location with the selected task or activity via e.g., tagging the geographical location and/or the selected task. The link may be in the form of a tag, table, index, or the like. In some embodiments, the operator may indicate whether the particular task is to appear in a legend of a user interface of the mobile application.

Additionally, in some embodiments, various values for weather (e.g., production loss mud, rain damage, frozen material or frost, crane safety winds, hot weather damage, etc.) may also be selected by the operation and then linked to the selected task. In some instances, a user interface displayed to the operator may include an indication on whether the values for the weather are accounted for in the geographic map.

Additionally, in some embodiments, the operator may select a particular interval from a drop down list of different intervals for a time-based slider displayed to the operator. The intervals may be for a specific number of hours, days, weeks, etc. The time-based slider may be used by a construction worker of the web or mobile application to select various time periods to obtain information about tasks in progress during the selected time period described in further detail below.

In step 230, data server 103 may send an initial dataset for the project to a device (e.g., labtop 107, mobile device 109, etc.). The initial dataset for the project may at least a portion of the construction schedule including one or more tasks of the project and/or various data fields of the tasks (e.g., start date, end date, lag days, or any other fields of a task or activity discussed herein). The initial dataset may also include the geographical map of the construction site, the overlay objects, association information (e.g., tags, indexes, tables, etc.) determined in steps 215-225. For example, the initial dataset may include a table indexing the overlay objects to geographic locations of the geographic map, a table indexing overlay objects to tasks of the construction schedule, and/or a table indexing tasks to geographic locations of the geographical map. The initial dataset may also include legend selection information, the selected weather values associated with the tasks, and/or the interval selection for the time-based slider.

In some instances, data server 103 might not send information for all of the tasks or activities of the project since there may be thousands of tasks or activities. In other instances, data server 103 may send all of the information (e.g., all field values) for all of the tasks of the project. In some instances, data server 103 may send the initial dataset in response to receiving a request from a device (e.g., mobile device 109). In other instances, data server 103 may push or automatically send the initial dataset to the device.

In step 235, data server 103 may determine whether data server 103 has received a request from the device (e.g., laptop 107, mobile 109, etc.) and, if so, may determine and send a response to the device in step 240. For example, data server 103 may receive a request for data associated with a particular geographic location on the map from mobile device 109 and, in response, may determine task data associated with the geographic information and may send such information to mobile device 109. For example, data server 103 may receive a request for updated fields for a particular task from mobile device 109 and, in response, may send the updated fields to mobile device 109.

If, in step 235, data server 103 has determined that data server 103 has not received a request from the device, then, in step 245, data server 103 may determine whether data server 103 has received an update regarding the progress of a task from the device. If so, then in step 250, data server 103 may update the construction schedule in a local or cloud database. Additionally, data server 103 may import the updated information into scheduling database 132. The updated information may be in the form of a difference file including only the updated information for the one or more updated tasks or activities rather than including all of the information for all of the tasks or activities. However, in an alternative embodiment, the updated information may include all information for the tasks or activities of the project.

If, in step 245, data server 103 has determined that data server 103 has not received an update for tasks of the project from the device, then, in step 255, data server 103 may determine whether the project has been completed by e.g., checking a scheduled end date of the project or by checking a flag indicative of whether the project has been completed. The flag may be switched to indicate that the project has been completed by the operator or automatically after the end date of the project. If the project has not been completed, data server 103 may continue to monitor for requests and updates from the device (e.g., may repeat steps 235-255) until the construction project has been completed.

Figure 3:
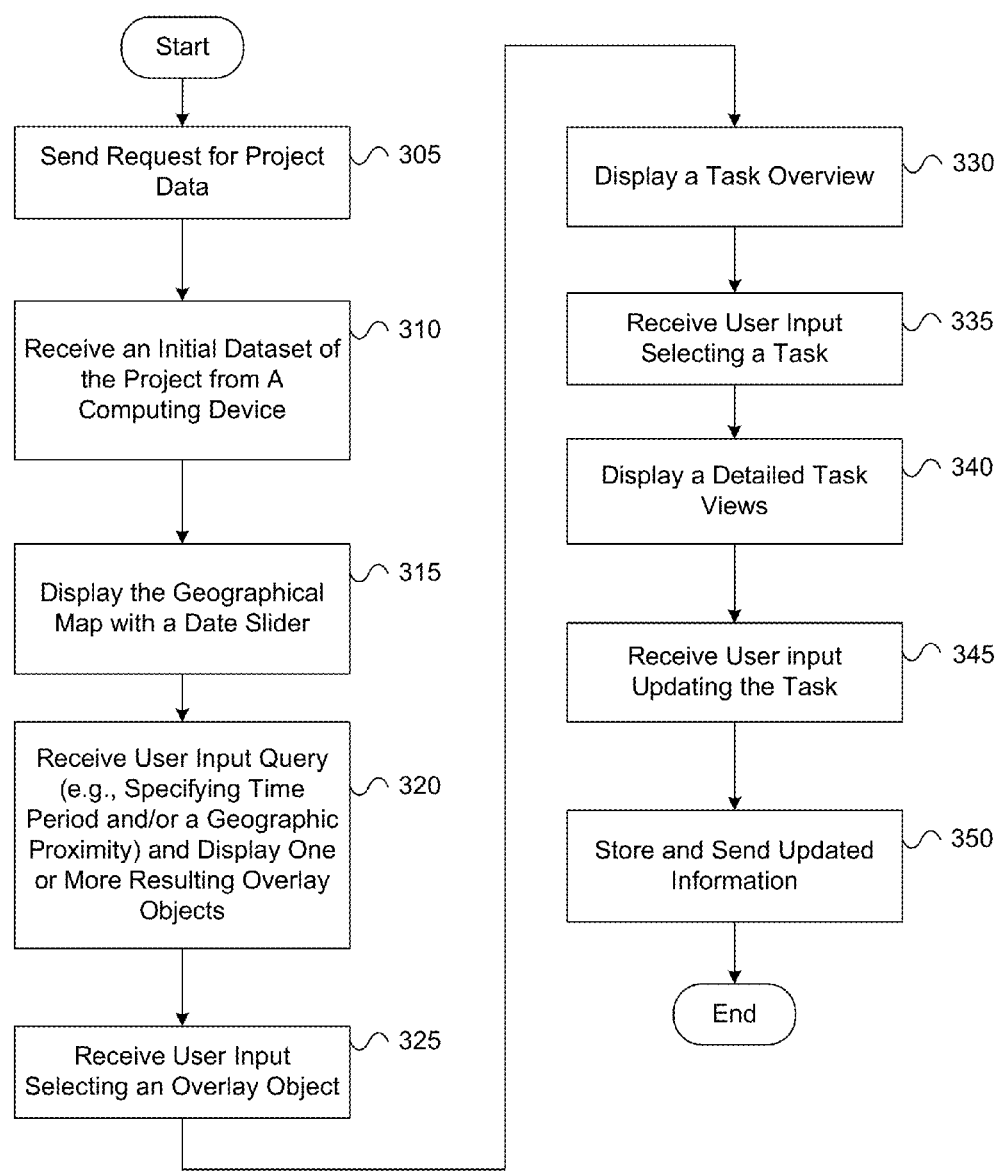
FIG. 3 depicts an illustrative flowchart for accessing and updating a geospatial scheduler in accordance with one or more illustrative aspects discussed herein.

FIG. 3 depicts an illustrative flowchart for accessing and updating a geospatial scheduler in accordance with one or more illustrative aspects discussed herein. In one or more embodiments, the method of FIG. 3 and/or one or more steps thereof may be performed by a computing device (e.g., laptop 107, mobile device 109). In other embodiments, the method illustrated in FIG. 3 and/or one or more steps thereof may be embodied in computer-executable instructions that are stored in a computer-readable medium, such as a non-transitory computer-readable memory. In some instances, one or more of the steps of FIG. 3 may be performed in a different order. In some instances, one or more of the steps of FIG. 3 may be omitted and/or otherwise not performed.

As seen in FIG. 3, the method may begin at step 305 in which a computing device (e.g., mobile device 109) may send a request for an initial dataset of a project to another computing device (e.g., data server 103). For example, in step 305, laptop 107 or mobile device 109 may send the request via an Internet browser or, alternatively, via a dedicated application. For mobile device 109 (e.g., smartphone), the dedicated application may be in the form of a mobile app downloaded from a website or an app store associated with a particular entity. The mobile app may be available in multiple versions corresponding to different mobile operating systems. While the description below will focus on mobile device 109 using a mobile app, the same functions may be performed by an internet browser. Additionally, the same functions may be performed by laptop 107 via an Internet browser or a software application.

A user (e.g., a construction worker in the field) may, using the mobile app, initiate a request for the initial dataset. In one example, the worker may simply select a project identifier and, in response, mobile device 109 may send a request including the project identifier, identifier of the mobile device, and/or an identifier of the construction worker to data server 103. In another example, the mobile app may support quick response (QR) functions in which the mobile app may permit the user to use an optical detection unit (e.g., a camera, scanner, etc.) of mobile device 109 to take a picture (e.g., generate an image) of a QR code and send the QR code as the request to data server 103 described in further detail in FIG. 4.

In step 310, mobile device 109 may receive the initial dataset from data server 103. As discussed above, the initial dataset for the project may include the constructions schedule including one or more tasks of the project, various data fields of the tasks (e.g., start date, end date, lag days, or any other fields of a task or activity discussed herein). The initial data may also include the geographical map of the construction site, the overlay objects, the association information created in steps 215-225, the legend selection information, the values for weather associated with the tasks, and/or the interval selection for the time-based slider.

Figure 5:
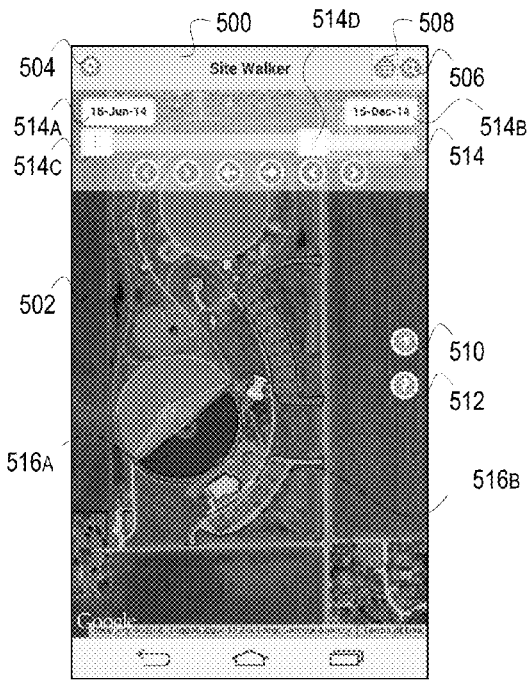
FIGS. 5-28 depict various illustrative user interfaces of a geospatial scheduler in accordance with one or more illustrative aspects discussed herein.

In step 315, mobile device 109 (e.g., through its mobile app) may display the geographical map of the construction site to the construction worker. For example, as shown in FIG. 5, a touch-based user interface 500 may present and/or otherwise include a geographical map 502 of the construction site, a dynamic date slider 514, a settings icon 504, a search icon 506, a task list icon 508, a first geographic search icon 510 for searching for tasks or activities within various distances of mobile device 109, a second geographic search icon 512 for searching for tasks or activities within various distances of a user-selected location on the geographical map, or the like.

Dynamic date slider 514 may allow the construction worker to select a time period to view all overlay objects for associated tasks scheduled to be in progress during the selected time period. Dynamic date slider 514 may display a start date or time 514a for the time period and may also display an end date or time 514b for the time period.

The dynamic date slider 514 may include various touch-based icons to modify and/or select a time period. For example, the dynamic date range 514 may include a first slider 514c and a second slider 514d. Additionally or alternatively, in some embodiments, the dynamic date slider 514 may include icons that when touched move the first slider 514c along the bar respectively in a first and second direction to adjust the start date or time of the time period. Similarly, the dynamic date range 514 may include icons that when touched move the second slider 514*d* along the bar respectively in a first and second direction to adjust the end date or time of the time period. Additionally or alternatively, in some embodiments, the dynamic date slider 514 may include an icon that simultaneously slides both the first slider 514*c* and the second slider 514*d* in a first direction along the bar and another icon that simultaneously slides both the first slider 514*c* and the second slider 514*d* in a second direction along the bar. In this illustrative embodiment, the second direction may be opposite the first direction.

Dynamic date slider 514 may be adjusted in accordance with the operator-selected date interval. As shown in FIG. 5, the date interval may be a calendar day, which may result from the operator of data server 103 selecting a one-day interval. However, in some instances, the operator may have selected a different interval (e.g., an n number of hours, days, weeks, months or any other interval). For example, if the selected date interval is every hour, then the construction worker may, using the dynamic date slider 514, set the start date or time of the time period as Jun. 16, 2014, 12:00 pm and may set the end date or time of the time period as Dec. 15, 2014, 2:00 pm.

In step 320, the mobile device 109 may receive one or more user input queries (e.g., constraints, filter, parameters, etc.) to search for tasks that match each of the constraints of the queries. As will be discussed in further detail below, one or more queries may be used to retrieve and/or otherwise determine tasks scheduled to be in progress during a particular time period (using the dynamic date slider 514), that are within a geographic proximity of a geographic location, and/or have a specific field value or attribute value (e.g., group parameter, person parameter, resource parameter, lag days parameter, float days parameter, and/or any parameter associated with a field of the construction schedule).

For instance, mobile device 109 may receive user input (e.g., a query or filter) and may query a locally stored dataset to determine tasks that meet the constraints of the query. Additionally or alternatively, mobile device 109 may send the query to a remote database (e.g., a cloud database of data server 103) and, in response, may receive a notification of overlay objects and corresponding tasks that meet the constraints of the query determined by the remote database. In some instances, mobile device 109 may receive the overlay objects and task data for tasks that meet the constraints of the query. Alternatively, if mobile device 109 has already stored the values of the fields of the tasks and/or the overlay objects (e.g., such information was included in the initial dataset), mobile device 109 may simply receive identifiers of the tasks and/or identifiers of the overlay objects that meet the constraints of the query. Mobile device 109 may then determine and display overlay objects associated with tasks that meet the constraints of the query.

In one example, a construction worker may wish to use time-phasing capabilities of the displayed geographic map to view overlay objects for associated tasks that are scheduled to be in progress during a specific time period. As shown in FIG. 5, the construction worker may select and/or modify a time period using the dynamic date slider 514. For example, the construction worker may touch and slide the first slider 514*c* along a bar to adjust the start date or time of the time period. Similarly, the construction worker may touch and slide the second slider 514*d* along the bar to adjust the end date or time of the time period. Mobile device 109 may determine tasks scheduled to be in progress during the selected time period using the construction schedule (e.g., start date, end date, in progress dates, etc.). Mobile device 109 may, using the association between the tasks and the overlay objects, determine which overlay objects are associated with the determined tasks. Additionally, mobile device 109 may determine the geographic locations of the one or more determined overlay objects or tasks using the association of the geographic locations with the determined overlay objects or the association of the geographic locations with the determined tasks. Mobile device 109 may then display the determined overlay objects on the geographical map 502 at the respective determined geographic locations. For example, as shown in FIG. 5, user interface 500 may include determined overlay objects 516 overlaid on the geographical map 502 at their respectively determined geographic locations where the determined overlay objects 516 have tasks or activities in progress during the time period beginning on Jun. 16, 2014 and ending on Dec. 15, 2014.

Additionally, mobile device 109 may also determine and/or otherwise identify displayed overlay objects that do not include tasks that are scheduled to be in progress during the time period and may remove those overlay objects and/or tasks from the displayed geographical map 502. As a result, mobile device 109 may only display overlay objects having tasks or activities in progress during the selected time period. As the construction worker modifies the dynamic date slider 514, the displayed overlay objects may change if different tasks are scheduled to be in progress during the modified time period. If there are other queries or constraints, the determined activities and, thus, the displayed objects may also meet each of these other constraints.

As a result of mobile device 109 displaying objects at the geographic locations at which their associated tasks are to be completed and displaying only those objects for tasks scheduled to be completed during the selected time period, mobile device 109 reveals to the construction worker the spatial and temporal relation of the tasks of the construction schedule.

Figure 6:
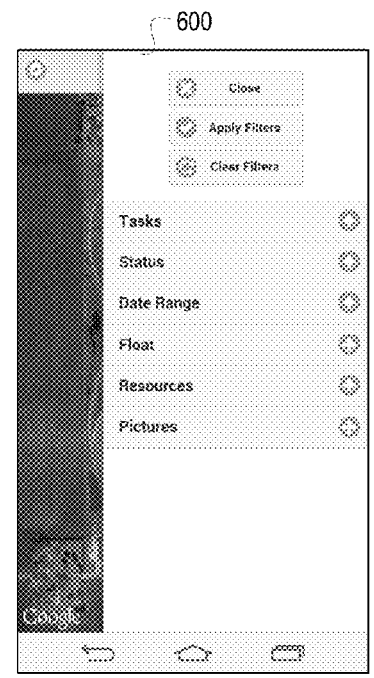
Figure 7:
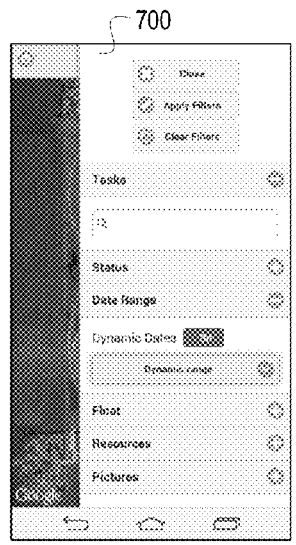
Figure 8:
Figure 9:
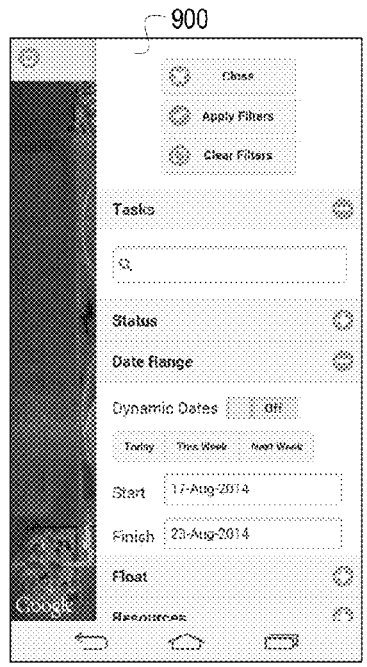

Additionally or alternatively, in some embodiments, the construction work may modify the time period using search icon 506. Mobile device 109 may, in response to receiving a selection of search icon 506, display user interface 600 that includes options for the user to apply filters, clear filters, and select filters. As shown in FIG. 6, user interface 600 may include options to filter based on tasks, status, date range, float, resources, pictures, or the like. In response to receiving a selection of the date range option, mobile device 109 may display user interface 700 as shown in FIG. 7, which may include an option to switch on or off a dynamic date range. If the construction worker opts to turn on the dynamic date range, mobile device 109 may display user interface 800 as shown in FIG. 8, which includes options to select a predefined time period from a list of predefined time periods (e.g., today, current week, next week, current month, next month, etc.). The time period may be considered dynamic because the time period may change each time the construction worker applies the date range filter as a result of changes in the current date. If the construction worker opts to turn off the dynamic date range, mobile device 109 may display user interface 900 as shown in FIG. 9 that includes fields in which the construction worker may enter a start date or time and an end date or time to define the time period.

Figure 10:
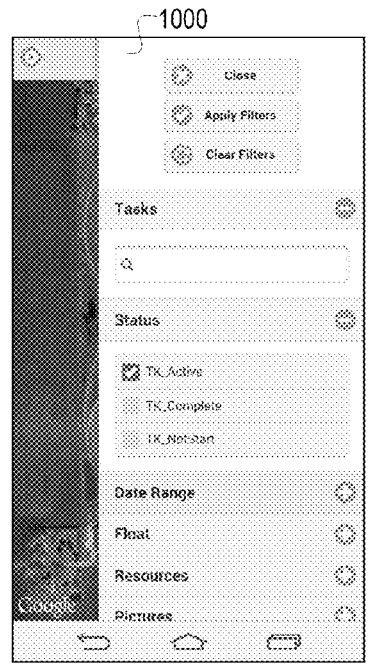

In another example, the construction worker may filter and display objects and associated tasks based on tasks having specified value in one of its fields or attributes. For example, as shown in FIG. 10, mobile device 109 may display user interface 1000 that includes a search box to enter the specified value. In another example, the construction worker may filters tasks based on status as shown in FIG. 10. For example, user interface 1000 may include multiple predetermined status options by which to filter tasks. In this instance, the predetermined status options include active tasks (TK_Active), completed tasks (TK_Complete), and tasks that have not been started (TK_Not-Start). In some embodiments, other status may be used (e.g., tasks that have been 75% complete, etc.).

Figure 11:
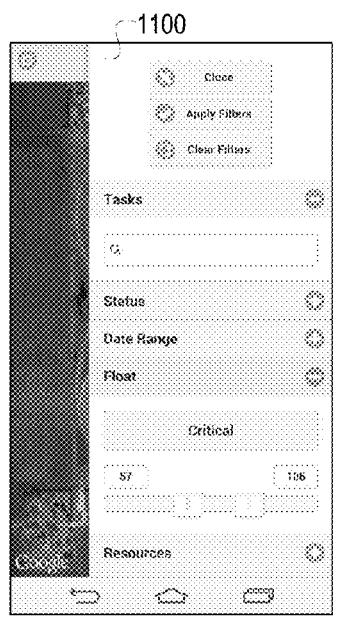

In another example, the construction worker may filter and display objects and associated tasks based on a float range. Float is the amount of time (e.g., in days) that a task may be delayed without causing a delay to either a subsequent task and/or a project completion date. As shown in FIG. 11, user interface 1100 may permit the construction worker to enter minimum float and a maximum float via a slider (similar to that of the dynamic date slider discussed above) and/or may include fields in which a float value may be entered. As a result, when the float filter is applied, mobile device 109 and/or data server 103 may filter out tasks that have float values outside of the user-selected range. In other words, mobile device 109 may only display objects and/or associated tasks that have float values within the user-selected float range.

Figure 12:
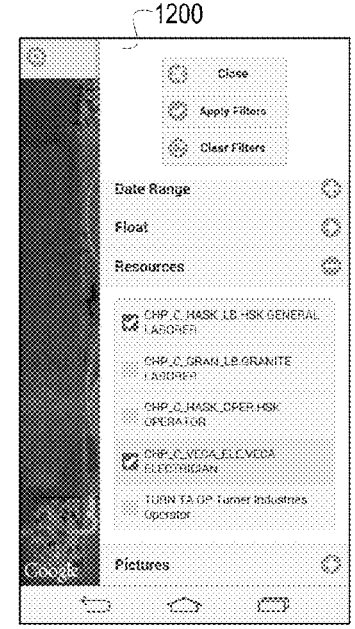

In another example, the construction worker may filter and display objects and associated tasks based on one or more resources. For example, as shown in FIG. 12, mobile device 109 may display user interface 1200 that includes a predefined list of resources. The construction worker may select one or more of the resources to apply as a filter. As a result, when the resource filter is applied, mobile device 109 and/or data server 103 may filter out objects and/or tasks that do not include the resource. In other words, mobile device 109 may only display object and/or tasks that include one or more of the selected resources.

Figure 13:
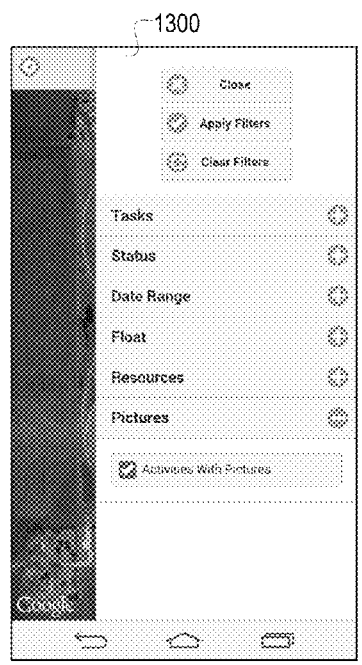

In another example, the construction worker may filter objects and associated tasks based on whether the task has pictures. For example, as shown in FIG. 13, mobile device 109 may display user interface 1300 that includes an option to filter based on "activities with pictures." As a result, when the picture filter is applied, mobile device 109 and/or data server 103 may filter out objects and/or tasks that do not include a picture. In other words, mobile device 109 may only display objects and/or tasks that are associated with a picture. In some embodiments, user interface 1300 may include an option to specify a specific picture.

In some of the examples, mobile device 109 may apply a filter upon being set by the construction worker. In other embodiments, mobile device may apply the filter upon selection of an apply filter icon shown in e.g., FIG. 13. Once each of the tasks that meet the constraints of each of the applied filters is determined, mobile device 109 may display objects associated with those tasks overlaid on the geographical map at their corresponding geographic location for the construction worker to view.

Figure 14:
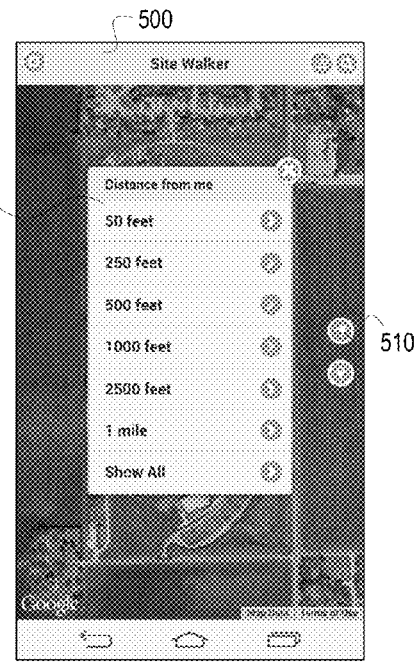

In another example, the construction worker may select a first geographic proximity search icon 510 to view activities near the geographic location of the construction worker while the construction worker moves about the construction site. In response, mobile device 109 may display a proximity distance list 1418, which may be labeled as "Distance from me" as shown in FIG. 14. As shown, proximity distance list 1418 may include multiple preset user-selectable distances (e.g., 50 feet, 250 feet, 500 feet, 1000 feet, 2500 feet, 1 mile, show all, or any other distance). The "show all" option may display overlay objects that have tasks or activities currently in progress.

For example, if the construction worker selects the 50 feet option, mobile device 109 may determine the geographic location (e.g., a set of latitude and longitude coordinates) of mobile device 109 via e.g., a global positioning system (GPS) included within mobile device 109. Mobile device 109 may, using the construction schedule, determine each task that is scheduled in progress either currently or during a selected time period. Mobile device 109 may then determine which of those tasks are located within 50 feet of the mobile device 109 based on the association of the tasks with the geographic locations of the geographical map 502. Once the tasks are determined, mobile device 109 may determine overlay objects associated with determined tasks using association information (e.g., the association between the overlay objects and the tasks). Mobile device 109 may display to the construction worker on the construction site those overlay objects that have tasks that are scheduled to be in progress during e.g., a selected time period and that are within 50 feet of the current location of the construction worker. The objects may be overlaid on the geographical map at their corresponding geographic locations.

Additionally, in some instances, mobile device 109 may place an indicator of the current location of mobile device 109 on the geographical map 502 and may also include direction heading or compass information to help the construction worker navigate to the geographic location of a displayed overlay object. Additionally, as will be discussed in further detail below, the construction worker may select a displayed overlay object (e.g., by touching the overlay object) to view tasks or activities currently in progress and are associated with that overlay object. As a result, the construction worker may, at any time, determine what tasks or activities are going on around him or her while moving around the construction site.

Figure 15:
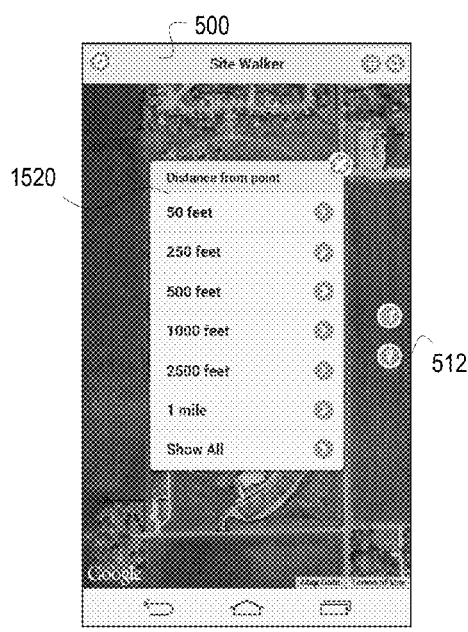

In another example, the construction worker may select a second geographic proximity search icon 512 to view activities near a geographic location selected by the construction worker. In response, mobile device 109 may permit the construction worker to place a marker on the geographical map 502 (e.g., by touching a location of the map 502) and may, once the marker is placed, display a proximity distance list 1520, which may be labeled as "Distance from point" as shown in FIG. 15. As shown, proximity distance list 1520 may include multiple different preset user-selectable distances (e.g., 50 feet, 250 feet, 500 feet, 1000 feet, 2500 feet, 1 mile, show all, or any other distance).

For example, if the construction worker selects the 250 feet option and selects/touches a location on the geographic map 502, then mobile device 109 may identify the geographic location of the selected location. Mobile device 109 may, using the construction schedule, determine each task schedule to be in progress either currently or during a selected time period (e.g., using dynamic date slider 514). Mobile device 109 may then determine which of those tasks are located within 250 feet of the mobile device 109 using the association of the tasks with the geographic location of the geographical map 502. Once the tasks are determined, mobile device 109 may determine the overlay objects associated with the determined tasks using association information (e.g., the association between the overlay objects and the tasks). Mobile device 109 may display to the construction worker on the construction site those overlay objects that have tasks or activities that are scheduled to be in progress either currently or within a selected time period and that are also within 250 feet of a selected geographic point on geographical map 502. The objects may be overlaid on the geographical map 502 at their corresponding geographic locations.

As discussed above, in some instances, mobile device 109 may also determine its geographic location and display an indicator of the location of the mobile device 109 on the geographical map 502. Additionally, in some instances, mobile device 109 may also display orientation information. Additionally, as will be discussed in further detail below, the construction worker may select a displayed overlay object (e.g., by touching the overlay object) to view tasks associated with that overlay object. As a result, the construction worker may at any time determine what tasks are going on around a selected geographic location on the geographical map 502 of the construction site.

In the event more than one query is selected by the construction worker, mobile device 109 may determine those tasks that meet each of the constraints and display their associated overlay objects. For example, the overlay objects displayed based on the geographic proximity to the mobile device or selected point on the geographic map may be further limited by other query parameters. For example, mobile device 109 may have received other query parameters from the construction worker (e.g., a QR code discussed in detail below, a date parameter via the dynamic date slider, a group parameter, person parameter, or any other parameter discussed herein and/or otherwise associated with a construction schedule). For example, if the construction worker has also set a time period via the dynamic date slider, mobile device 109 may only display those overlay objects and associated tasks that are meet both the geographic proximity parameter and the time period parameter. In other words, if the selected proximity parameter is 50 feet from a selected geographic location and the time period parameter is from July 5 through July 7, then mobile device 109 may only display objects and associated tasks that are within 50 feet of the selected geographic location and are scheduled to be in progress on July 5, July 6, or July 7.

Additionally, as the construction worker modifies the queries (e.g., the dynamic date slider, geographic location selection, etc.), mobile device 109 may determine tasks that meet each of the modified constraints and display their corresponding objects. If one or more previously displayed objects no longer have any tasks that meet each of the modified constraints, mobile device 109 may remove those objects from display.

Figure 16:
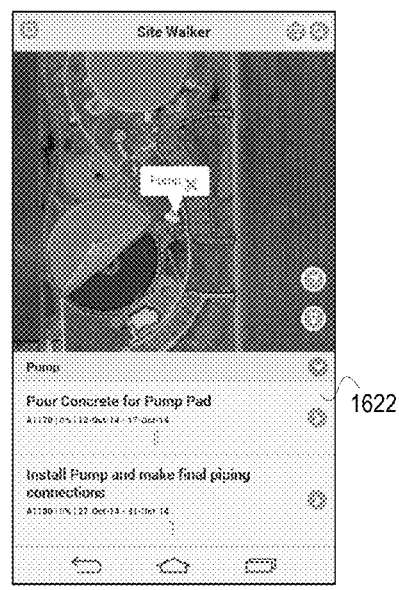

Returning to FIG. 3, in step 325, mobile device 109 may receive user input selecting an overlay object displayed on the geographic map. In response, in step 330, mobile device 109 may display an overview of tasks in progress. For example, the construction worker may touch a particular overlay object. In response, mobile device 109 may display an indicator (e.g., a pin) on the overlay object and a name of the overlay object (e.g., a name of the structure being built) as shown in FIG. 16. Mobile device 109 may also display a collapsible task overview 1622 including an identifier of the task, the percentage complete, its start and end dates, and a time-based progress bar (e.g., a Gantt chart). For example, as shown in FIG. 16, mobile device 109 may display a "pump" text box indicated that the selected overlay object corresponds to a pump and may display overview of tasks including a "Pour Concrete for Pumping Pad" task and an "Install Pump and make final piping connections" task. In instances where the task overview 1622 is collapsed, the activities overview 1622 may be expanded upon user selection of an icon.

Figure 17:
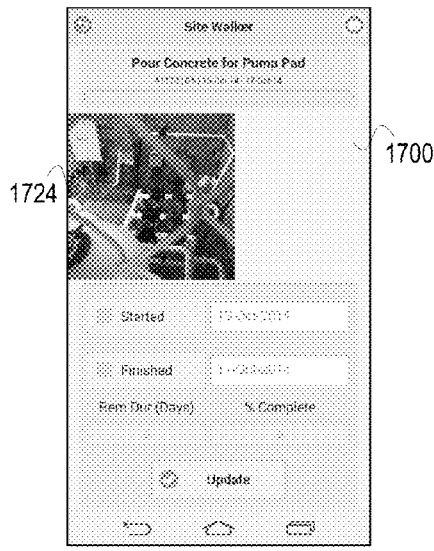
Figure 18:
Figure 19:
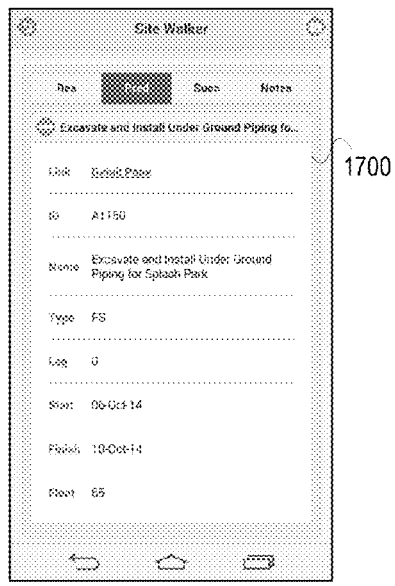
Figure 20:
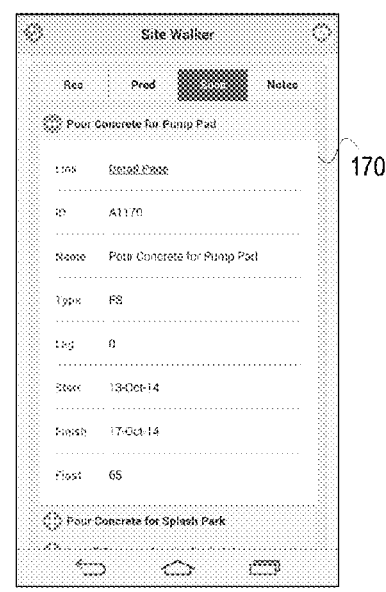
Figure 21:
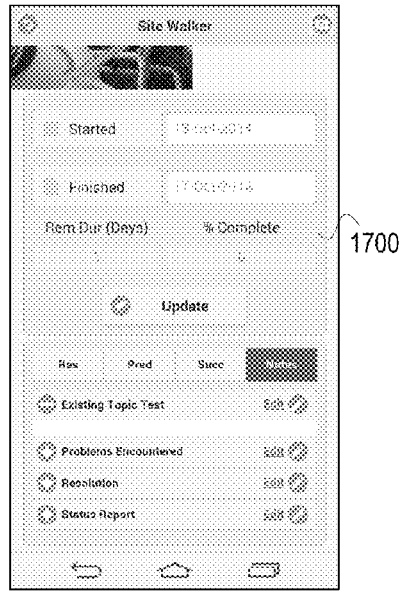

In step 335, mobile device 109 may receive user input selecting a task. In response, in step 340, mobile device 109 may display a detailed view of the task. For example, the construction worker may select (e.g., touch) the "Pour Concrete for Pumping Pad" task and, in response, mobile device 109 may display a detailed view user interface 1700 as shown in FIG. 17. Like the task overview 1622, detailed view 1700 may include an identifier of the task, the percentage of the activity that has been completed, the scheduled start date, the scheduled end date, and a progress bar. Additionally, detailed view 1700 may also include a picture filmstrip of one or more pictures 1724 of the task. Picture 1724 may be displayed in an expanded view upon user selection. The detailed view 1700 may display the remaining duration ("Rem Dur") in days and an update icon as shown in FIG. 9 as well as multiple tabs as shown in FIGS. 18-21. As shown in FIG. 18, one of the tabs may be for a resource associated with the task assigned by the creator of the construction schedule. When the resource tab is selected, the detailed view 1700 may include a name of the resource, an actually used amount of resource, a remaining amount of resource, and/or a budgeted amount of the resource. As shown in FIG. 19, when the predecessor (pred) tab is selected, detailed view 1700 may include a link to a webpage, an identifier of the predecessor task (e.g., a task scheduled to occur immediately before the selected task), a type of task, a number of lag days, a start date of the predecessor task, a finish date of the predecessor task, and/or a number of float days of the predecessor task. As shown in FIG. 20, when the successor (succ) tab is selected, detailed view 1700 may include a link to a webpage, an identifier of the successor task (e.g., a task scheduled to occur immediately after the selected task), a type of task, a number of lag days, a start date of the successor task, a finish date of the successor task, and/or a number of float days of the successor task. As shown in FIG. 20, each of the tasks may be expanded or collapsed. As shown in FIG. 21, when the notes tab is selected, the construction worker may enter notes for a particular task discussed in detail below.

In step 345, mobile device 109 may receive user input from the construction worker updating one or more fields for a task, inputting notes for the task, and/or associating a picture with the task. In one example, mobile device 109 may receive, from the construction worker while the construction worker is in the field, an update to one or more of the percentage complete, the estimated start date, the estimated end date, the number of lag days, or any other field discussed herein.

In another example, mobile device 109 may receive textual notes for a particular task (e.g., via the notes tab of the detailed view 1700 shown in FIG. 21) input by the construction worker while he or she is in the field. For instance, the notes tab allows constructions workers to create one or more topics for the task or activity. In some embodiments, mobile device 109 may limit the number of topics that may be created by the constructions workers to e.g., 3 topics to prevent construction workers from creating an extensive list of topics. In some embodiments, mobile device 109 may prevent construction workers from creating a duplicate topic for the task. When a topic of is selected by a construction worker, mobile device 109 may display a text box to permit the construction worker to enter notes. Topics may include problems encountered, resolution, status update, etc.

Figure 22:

In yet another example, the construction worker may use mobile device 109 to take a picture of the current state of the task in progress and may associate and/or otherwise link the picture with the task. For example, as shown in FIG. 22, mobile device 109 may display a selectable camera icon 2226 to allow the construction worker to select a picture source (e.g., the camera or a picture library) from which to select and/or otherwise obtain a picture to associate (e.g., link, tag, etc.) with the task. In one example, the construction worker may take a picture of the task using a camera of mobile device 103. Mobile device 109 may then tag the picture in order to link the picture with the task. The picture may also be tagged with a date or time the picture was taken.

In step 350, mobile device 109 may store any updates provided by the construction worker in the field and may also send the updated information to other devices (e.g., data server 103). For example, in step 350, mobile device 109 may receive input updating a field or tagging picture as discussed above. As shown in FIG. 17, the detailed view 1700 may include an update icon that the construction worker may select to store the updated information locally and also to send the updated information to one or more remote database (e.g., cloud database of data server 103). For example, mobile device 109 may create a difference file including the updated information (e.g., updated fields, notes, pictures, etc.) and their corresponding tasks or activity identifiers. In some instances, the difference file may include the update time of the updated information to data server 103 track which sets of updated information for a task or activity is the latest set of updated information (i.e., which updated information is most current). In some instances, the difference file may also include an identifier of mobile device 109 and/or an identifier of the author (e.g., the construction worker). The difference file might not include information associated with tasks or activities that have not been updated. Once the information has been updated at the remote database, mobile device 109 may receive a message indicating that the remote database has been updated and may, in response, display an alert to the construction worker indicating that the input information has been updated.

Once data server 103 receives the difference file from mobile device 109, data server 103 may, using the updated information, update the construction schedule in either a local or cloud database to allow other devices (e.g., labtop 107, another mobile device, or the like) to access the updated construction schedule and/or updated tasks or activities. For example, another (e.g., a second) mobile device may now access, retrieve and/or otherwise receive the tagged picture taken by the construction worker. The second mobile device may display the tagged picture with a detailed view for the task associated with the picture's tag (i.e., the same task that mobile device 109 associated with the picture). Similarly, in another example, the second mobile device may receive and display an updated percentage complete field for a particular task.

In instances where data server 103 receives multiple updates for the same field of a particular task in the same day (or other predetermined time period), data server 103 may compare the various update values to determine whether they are inconsistent (e.g., do not match). If the various update values do not match (e.g., a first update indicates that a task is 50% complete and a second update indicates that the same task is 75% complete), data server 103 may determine which devices sent the updates. If one of updates came from mobile device 109 at the construction site and other update came from a device remote from the construction site (e.g., a central office), data server 103 may use the update from mobile device 109 at the construction site and ignore the update from the device remote from the construction site because a construction worker using mobile device 109 at the construction site would have first-hand knowledge of the current progress of the task. Alternatively, data server 103 may use the update that occurred later in time and ignore the earlier occurring update.

Additionally, in some embodiments, data server 103 may import the difference file into scheduling database 132 so that scheduling server 103 may update the construction schedule using a proprietary scheduling algorithm or any other scheduling algorithm.

Figure 23:
Figure 24:
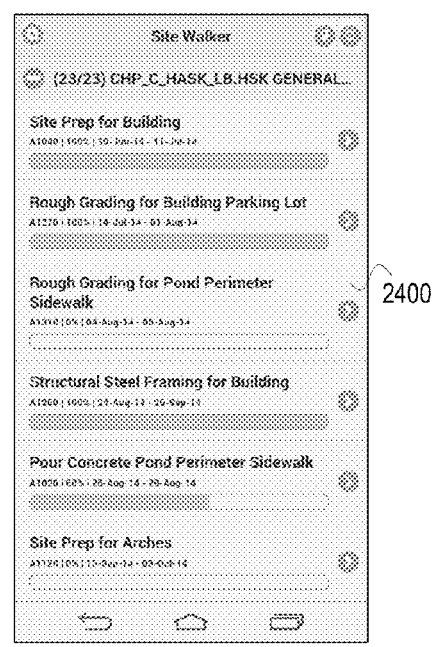

FIGS. 23 and 24 depict various user interfaces for a list feature in accordance with one or more illustrative aspects discussed herein. In response to a user selection of task list icon 508 shown in FIG. 5, mobile device 109 may display user interface 2300 that includes a collapsed list of tasks. For example, in this instance, user interface 2300 includes task "CHP_C_HASK_LB.HSK GENERAL . . . " User interface 2300 may include a number of sub-tasks either in progress or completed and a number of total sub-tasks. In this instance, the above task has 23 sub-tasks in progress or completed out of 23 total sub-tasks. The collapsed list may be grouped by area, activity codes defined in the legend upon setup discussed above, geographic proximity, date range, float, resources, etc. The groupings may be selected and/or changed in the settings menu discussed below in FIGS. 25-27.

Upon selection of one of the tasks, mobile device 109 may expand that task on the collapsed list to display user interface 2400 shown in FIG. 24. User interface 2400 may include a Gantt chart (e.g., progress bars) and summary information including, for example, a task identifier, percentage complete, start date, end date, etc. The tasks in the list views of FIGS. 23 and 24 are also subject to the queries discussed above. In other words, the tasks displayed in user interfaces 2300 and 2400 may include only those tasks that meet the constraints of each of one or more queries.

Figure 25:
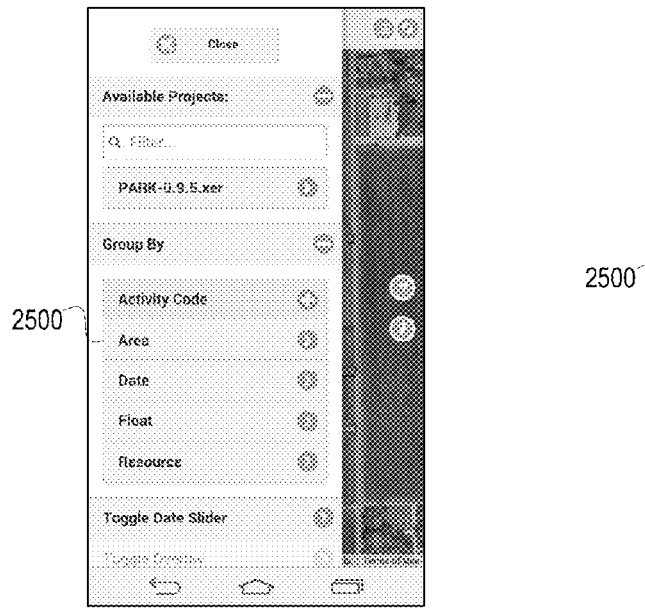
Figure 26:
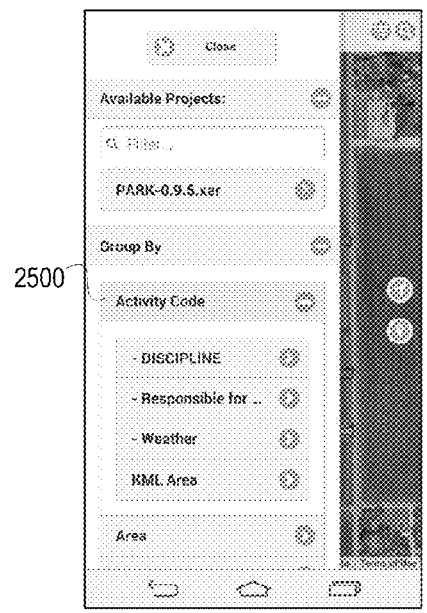
Figure 27:
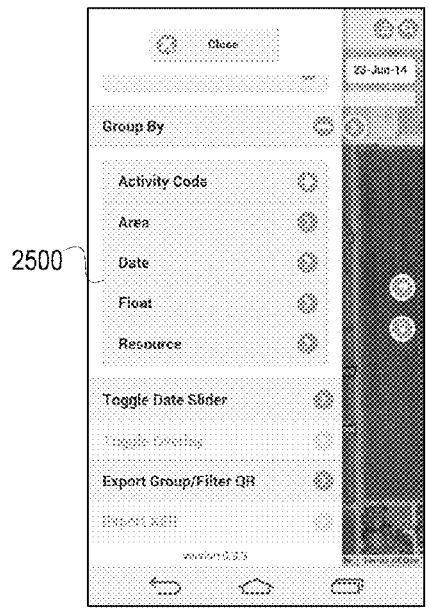

FIGS. 25-27 depict various user interfaces of a settings menu in accordance with one or more illustrative aspects discussed herein. As shown in FIG. 25, mobile device 109 may display user interface 2500 that includes a selectable list of available projects, list of groups, toggle date slider, and/or a toggle overlay. In some instances, the mobile device 109 may receive a selection of an available project from a construction worker. In response, mobile device 109 may retrieve, from data server 103, a dataset (e.g., an initial dataset) if mobile device has not yet stored a dataset associated with the selected project. In some instances, mobile device 109 may receive a selection of the "group by" option, which may result in mobile device 109 displaying a submenu of grouping options. The grouping options may include grouping by activity code, date, float, resource, or the like. Upon selection of the "activity code" option in FIG. 25, mobile device 109 may display a submenu of activity codes (e.g., discipline, person or group responsible for, weather, KML area, etc.) as shown in FIG. 26. Upon selection of the "toggle date slider," mobile device 109 may display the dynamic date slider discussed as shown in FIG. 5.

In some embodiments, user interface 2500 may include a toggle overlay feature. In some instances, data server 103 may send a computer-aided design (CAD) drawing, schematic, or blueprint of the construction project to mobile device 109. Data server 103 may space activities and tasks in the CAD drawing to align with their geographic location on the geographical map of the construction site. When the construction worker toggle the overlay into an "on" state, mobile device 109 may overlay the CAD drawing on the geographical map. The CAD drawing may be at least partially transparent to allow the construction worker to view the underlying geographical map and/or other overlay objects.

As shown in FIG. 27, user interface 2500 may include a selectable "export group/filter QR" option. Quick response (QR) codes may be placed at multiple geographic locations within a construction site. The QR codes may be in the form of QR stickers affixed to various locations of the construction site or items (e.g., construction equipment) in the construction site (e.g., tools, toolboxes, resource materials such as piping or wood, motorized equipment, earthmover equipment, backhoe equipment, wrecking ball crane, etc.). Each of the QR codes may be associated with a predetermined set of queries of a dynamic dataset (e.g., fields or attributes of the construction schedule, geographical map, and/or overlay objects). A construction worker may, using mobile device 109, scan a QR code placed in the construction site and, in response, mobile device 109 may determine tasks that meet the constraints the of the queries and display associated objects as will be discussed in further detail below in FIG. 4.

Figure 4:
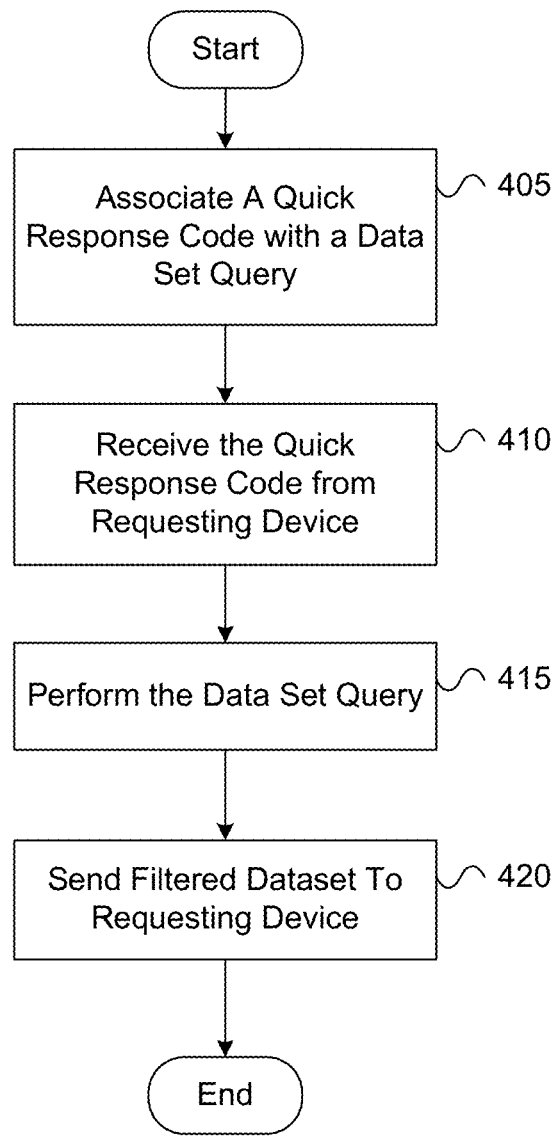
FIG. 4 depicts an illustrative flowchart for performing preset queries of dynamic datasets in accordance with one or more illustrative aspects discussed herein.

FIG. 4 depicts an illustrative flowchart for performing preset queries of dynamic datasets in accordance with one or more illustrative aspects discussed herein. In one or more embodiments, the method of FIG. 4 and/or one or more steps thereof may be performed by a computing device (e.g., data server 103). In other embodiments, the method illustrated in FIG. 4 and/or one or more steps thereof may be embodied in computer-executable instructions that are stored in a computer-readable medium, such as a non-transitory computer-readable memory. In some instances, one or more of the steps of FIG. 4 may be performed in a different order. In some instances, one or more of the steps of FIG. 4 may be omitted and/or otherwise not performed.

As seen in FIG. 4, the method may begin at step 405 in which a computing device (e.g., data server 103) may associate and/or otherwise link a quick response (QR) code with one or more preset queries for a dynamic dataset. For example, in step 405, multiple QR codes may be placed throughout a construction site. Each QR code may be linked to one or more preset queries and/or a filter used to search e.g., a cloud database storing a dataset of the project. The dataset may include the geographical map of the construction site, each of the attributes or fields of the construction schedule, and/or association information (e.g., associations between overlay objects, geographic locations, and/or tasks of the construction schedule). The preset queries may be any query discussed herein.

Data server 103 may associate each QR code with one or more preset queries that are contextually relevant to the location (e.g., area) at which the QR code is placed in the construction site and/or equipment type on which the QR code is placed. For example, a first QR code may be placed at a location where a pump is being constructed and may be associated with one or more preset queries relevant to construction workers who construct the pump. A second QR code may be placed in a toolbox used by electricians moving about the construction site and may be associated with preset queries relevant to electricians. A third QR code may be affixed to a piece of wood or other resource to indicate which task applies to that piece of wood, where the task is located on the geographic map of the construction site, and when the task is scheduled to begin. Additionally or alternatively, one or more of preset queries may filter the dataset based on group (e.g., electrician group, cable group, plumbing group, etc.), person, start date, end date, lag days, float days, and/or any other attribute or field of the dataset. Additionally or alternatively, one or more preset queries may filter the dataset based on a preset time period starting at a current date (i.e., a dynamically changing input value). For example, the preset time period may be for 7 days. If the current date is July 1, then the time period used in the query may be July 1 through July 8. If the current date is July 9, then the time period used in the query may be July 9 through July 16. As will become apparent from the description below, a construction worker may, via mobile device 109, be able to view tasks relevant to a particular location that are scheduled to be in progress during the next 7 days using a QR code associated with this preset query.

In step 410, data server 103 may receive a QR code from a device (e.g., mobile device 109). For example, a QR code may be placed at a geographic location of the construction site where a pump is being constructed at a construction site. Mobile device 109 may, using its camera, scan and/or otherwise take a picture or image of the QR code and send the QR code to data server 103. Alternatively, rather than sending a picture of the QR code, mobile device 109 may determine which identifier from a locally stored set of identifiers corresponds to the QR code and may send the identifier to data server 103.

In step 415, data server 103 may determine the one or more preset queries associated with the received QR code. Data server 103 may then query and/or otherwise filter a dataset stored in either a local or cloud database using one or more preset queries to produce a filtered dataset. The filtered dataset may include those tasks or activities that meet each of the constraints set forth by the one or more preset queries. For example, the filtered dataset may include tasks or activities of a pump that are scheduled to be in progress during the next two weeks and schedule to be performed by an electrician. For example, one of the tasks may be to connect the pump to wiring in a nearby wall.

In step 420, data server 103 may send the filtered dataset to the requesting device (e.g., mobile device 109). Mobile device 109 may then display overlay objects that have tasks that meet each of the constraints of the queries overlaid on the geographical map at their corresponding geographic locations. Additionally or alternatively, mobile device 109 may display a list of tasks that meet each of the constraints of the one or more preset queries determined from the scanned QR code. Additionally, mobile device 109 may present a tasks overview as discussed above and may, in response to a selection of a particular task, display a detailed view of the task as discussed above. Additionally or alternatively, rather than sending the filtered dataset to the requesting device, data server 103 may send a uniform resource locator (URL) code (e.g., a hypertext transfer protocol address) of a webpage from which mobile device 109 may access the filtered dataset. In such instances, mobile device 109 may automatically launch a browser, retrieve the webpage from a web server, and display the webpage to the construction worker (e.g., the electrician in the above example). Additionally or alternatively, in some embodiments, the QR code may specify a format or layout of the webpage.

In one example, a QR code may be placed in a toolbox used by plumbers and moved about the construction site. The QR code may be associated with one or more preset queries to filter the dataset based on plumbing activities scheduled to be in progress during a two day time period beginning from the current date. As a result, each day, a plumber may scan the QR code in the toolbox using mobile device 109 to view plumbing tasks to work on that day and the following day. Consequently, in some instances, a single QR code may be used by a particular construction worker or a particular set of construction workers to complete all of their assigned tasks. In other instances, multiple QR codes may be used by a particular construction worker or a particular set of construction workers. In some embodiments, mobile device 109 may display overlay objects on the geographical map that include the filtered set of tasks or activities.

In another example, a manager tasked with monitoring and/or otherwise updating the current status of each of the tasks currently in progress may move about the construction site scanning various QR codes using mobile device 109, may view the current tasks in progress for that area based on the QR code, and may update the status of each of the tasks currently in progress.

In some embodiments, if mobile device 109 has either direct access to the full dataset or the full dataset is locally stored, mobile device 109 may perform the process at mobile device 109 without using data server 103 (e.g., determine task results of constraints of QR code).

As discussed above, mobile device 109 may perform various functions using a mobile app. However, additionally or alternatively, in some instances, mobile device 109 may perform one or more of the various functions by communicating with a webserver (e.g., data server 103) using a mobile browser.

Figure 28:

Additionally or alternatively, client device 107 (e.g., desktop, laptop, tablet, etc.) may perform any of the features performed by mobile device 109 discussed herein either through a software application or an Internet browser. FIG. 28 illustrates an example of browser user interface 2800 of client device 107. One or more overlay objects may be associated (e.g., linked, tagged, indexed, etc.) with one or more discipline activity codes (e.g., sitework, concrete, structures, architectural, mechanical, piping, electrical, no activity code, etc.). In response to a construction worker selecting one or more discipline activity code filters, client device 107 may determine and display overlay objects that meet the constraints of the filters and any other applied filters (e.g., a date filter). Additionally or alternatively, client device 107 may send a request to data server 103 to filter a dataset of the construction project and, in response, may receive an indication of which overlay objects to display to the construction worker.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A system involving a construction site, comprising:
construction equipment affixed with a first quick response (QR) code, wherein the construction equipment is located at a construction site, and wherein the construction equipment comprises one of: a toolbox, a resource material, and a tool;
a mobile device comprising a wireless communications component, a visual display, an optical detection component, a processor and a computer readable medium storing instructions that, when executed by the processor, cause the mobile device to:
receive, through the wireless communications component, a geographic map of the construction site;
generate, through the optical detection component, an image of the first QR code; and
display, on the visual display, a first set of objects overlaid on the geographical map of the construction site respectively at a first set of geographical locations based on the first QR code, wherein the first set of objects is associated with a first set of tasks of a construction schedule; and
a computer server communicatively coupled over a network with the mobile device and comprising a processor and a computer readable medium storing instructions that when executed by the processor of the computer server, cause the computer server to:
receive, from the mobile device, the image of the first QR code;
determine the first set of objects and the first set of tasks that meet preset constraints of the first QR code; and
send, to the mobile device, a notification of the first set of objects and the first set of tasks.

2. The system of claim 1, further comprising:
a geographic location at the construction site affixed with a second QR code;
wherein the instructions, when executed by the processor of the mobile device, further cause the mobile device to:
generate, through the optical detection component, an image of the second QR code; and
display, on the visual display, the geographical map of the construction site with a second set of objects overlaid on the geographical map respectively at a second set of geographic locations based on the second QR code, wherein the second set of objects is associated with a second set of tasks of the construction schedule; and
wherein the instructions, when executed by the processor of the computer server, further cause the computer server to:
receive, from the mobile device, the image of the second QR code;
determine the second set of objects and the second set of tasks that meet preset constraints of the second QR code; and
send, to the mobile device, a notification of the second set of objects and the second set of tasks.

3. The system of claim 1, wherein the mobile device comprises a position determining component and a user input component, wherein the instructions, when executed by the processor of the mobile device, further cause the mobile device to:
receive, through the user input component, a selection of a geographic distance;
determine, through the position determining component, a geographic location of the mobile device;
determine that a task of the construction schedule is associated with a geographic location within the geographic distance from the geographic location of the mobile device; and
display, on the visual display, an object associated with the determined task overlaid on the geographic map at the geographic location associated with the determined task.

4. The system of claim 1, wherein the mobile device comprises a user input component, wherein the instructions, when executed by the processor of the mobile device, further cause the mobile device to:
receive, through the user input component, a selection of a geographic distance and a selection of a geographic location on the geographic map;
determine that a task of the construction schedule is associated with a geographic location within the geographic distance from the selected geographic location; and display, on the visual display, an object associated with the determined task overlaid on the geographic map at the geographic location associated with the determined task.

5. The system of claim 1, wherein the mobile device comprises a user input component,
wherein the instructions, when executed by the processor of the mobile device, further cause the mobile device to:
displaying, on the visual display, a dynamic date slider;
receive, through the user input component, a selection of a first time period using the dynamic date slider;
send, through the wireless communications component to the computer server, an indication of the first time period;
receive, through the wireless communications component from the computer server, an indication of a third set of objects and a third set of tasks scheduled to be in progress during the first time period;
display, on the visual display, the third set of objects overlaid on the geographic map respectively at a third set of geographic locations;
receive, through the user input component, a selection of a second time period using the dynamic date slider;
send, through the wireless communications component to the computer server, an indication of the second time period;
receive, through the wireless communications component from the computer server, an indication of a fourth set of objects and a fourth set of tasks scheduled to be in progress during the second time period; and
display, on the visual display, the fourth set of objects overlaid on the geographic map respectively at a fourth set of geographic locations,
wherein at least one object of the fourth set of objects is different from each object of the third set of objects.

6. An apparatus comprising:
a visual display;
a user input component;
a wireless communications component;
an optical detection component;
a processor; and
a computer readable medium storing instructions that, when executed by the processor, cause the apparatus to:
receive, through the wireless communications component, a geographic map of a construction site and a construction schedule comprising a plurality of tasks;
display, on the visual display, the geographic map of the construction site and a dynamic date slider;
receive, through the user input component, a selection of a first time period using the dynamic date slider, a selection of a geographic distance, and a selection of a geographic location on the geographic map, wherein the selected geographic location is different from a geographic location of the apparatus;
determine that a first set of tasks, of the plurality of tasks, are scheduled to be in progress during the first time period and are associated with a first set of geographic locations within the geographic distance from the selected geographic location;
display, on the visual display, a first set of objects associated with the first set of tasks overlaid on the geographic map respectively at the first set of geographic locations where the first set of tasks are to be completed;
generate, through the optical detection component, an image of a quick response (QR) code;
determine that the QR code is associated with a date range;
determine an end date of the date range based on a current date;
determine that a task, of the plurality of tasks, is scheduled to be in progress between the current date and the end date using the construction schedule; and
display, on the visual display, an object associated with the determined task overlaid on the geographic map at a geographic location associated with the determined task.

7. The apparatus of claim 6, wherein the computer readable medium storing instructions that, when executed by the processor, causes the apparatus to determine that the first set of tasks are scheduled to be in progress during the first time period further causes the apparatus to:
send, through the wireless communications component, an indication of the first time period; and
receive, through the wireless communications component, a notification that the first set of tasks are scheduled to be in progress during the first time period and a notification of the first set of objects.

8. The apparatus of claim 6, wherein the computer readable medium storing instructions that, when executed by the processor, further cause the apparatus to:
receive, through the user input component, a selection of a second time period using the dynamic date slider;
determine that a second set of tasks, of the plurality of tasks, are scheduled to be in progress during the second time period; and
display, on the visual display, a second set of objects associated with the second set of tasks overlaid on the geographic map respectively at geographic locations where the second set of tasks are to be completed.

9. The apparatus of claim 6, wherein the instructions that, when executed by the processor, further cause the apparatus to:
receive, through the user input component, a selection of a different geographic distance;
determine that a particular task, of the plurality of tasks, is associated with a geographic location within the different geographic distance from the geographic location of the apparatus; and
display an object associated with the determined particular task overlaid on the geographic map at the geographic location associated with the determined particular task.

10. The apparatus of claim 6, wherein the instructions that, when executed by the processor, further cause the apparatus to:
receive, through the user input component, a selection of an object associated with one or more of the first set of tasks; and
display a bar chart including start dates and finish dates for the one or more of the first set of tasks.

11. The apparatus of claim 6, wherein the instructions that, when executed by the processor, further cause the apparatus to:
generate, through the optical detection component, a photograph of a first task of the plurality of tasks;
associate the photograph with the first task of the plurality of tasks;

receive, through the user input component, an update to a field of a second task, of the plurality of tasks, from a user of the apparatus; and sending, through the wireless communications component, the photograph and the update to a remote database.

12. The apparatus of claim 6, wherein at least one object of the first set of objects is associated with a structure to be constructed at the construction site.

13. A method comprising:

receiving, at a mobile device from a remote server, a geographic map and a construction schedule comprising a plurality of tasks;

receiving a selection of a geographic distance from a user;

determining a geographic location of the mobile device;

determining that a task, of the plurality of tasks, is associated with a geographic location within the geographic distance from the geographic location of the mobile device;

displaying an object associated with the determined task overlaid on the geographic map at the geographic location associated with the determined task;

generating an image of a scannable sticker affixed to a geographic location of a construction site;

determining one or more constraints using the scannable sticker;

determining one or more tasks, of the plurality of tasks, that meet each of the one or more constraints;

determining one or more geographic locations associated with the one or more tasks; and displaying one or more objects associated with the one or more tasks overlaid on the geographic map respectively at the one or more geographic locations.

14. The method of claim 13, further comprising:

receiving a selection of a geographic location on the geographic map and a different geographic distance;

determining that a different task, of the plurality of tasks, is associated with a different geographic location within the different geographic distance from the selected geographic location; and displaying a different object associated with the determined different task overlaid on the geographic map at the different geographic location associated with the determined different task.

15. The method of claim 13, further comprising:

receiving a selection of a filter associated with one of a discipline, a group, or a resource;

determining a particular task, of the plurality of tasks, that meet constraints of the filter; and displaying an object associated with the determined particular task overlaid on the geographic map at a geographic location associated with the determined particular task.

16. The method of claim 13, further comprising:

displaying a dynamic date slider;

receiving a selection of a first time period using the dynamic date slider; and displaying a first set of objects of a first set of tasks, of the plurality of tasks, scheduled to be in progress during the first time period overlaid on the geographic map respectively at a first set of geographic locations at which the first set of tasks are to be completed.

17. The method of claim 16, further comprising:

receiving a selection of a second time period using the dynamic date slider; and displaying a second set of objects of a second set of tasks, of the plurality of tasks, scheduled to be in progress during the second time period overlaid on the geographical map respectively at a second set of geographic locations at which the second set of tasks are to be completed.

* * * * *